United States Patent [19]
Hummel

[11] Patent Number: 4,973,854
[45] Date of Patent: Nov. 27, 1990

[54] HYDRAULIC SHOCK-ABSORBER AND VIBRATION DAMPER WITH ADJUSTABLE DAMPING

[75] Inventor: Kurt M. Hummel, Wuppertal, Fed. Rep. of Germany

[73] Assignee: Herman Hemscheidt Maschinenfabrik GmbH & Co., Wuppertal, Fed. Rep. of Germany

[21] Appl. No.: 275,916

[22] Filed: Nov. 25, 1988

[30] Foreign Application Priority Data

Nov. 28, 1987 [DE] Fed. Rep. of Germany ....... 3740404

[51] Int. Cl.⁵ .................................................. F16F 5/00
[52] U.S. Cl. ................................. 267/64.26; 188/287; 188/299; 188/314; 188/322.14; 137/529; 280/714
[58] Field of Search ................... 188/299, 314, 322.14, 188/322.19, 322.22, 315, 284, 285, 287, 300; 267/64.26; 280/714; 137/529

[56] References Cited

U.S. PATENT DOCUMENTS

| | | | |
|---|---|---|---|
| 2,243,782 | 5/1941 | Thornhill | 267/64.26 |
| 2,783,859 | 3/1957 | Patriquin | 188/287 |
| 2,856,143 | 10/1958 | Westcott, Jr. | 267/64.26 X |
| 4,056,040 | 11/1977 | Fussangel | 188/285 X |
| 4,311,302 | 1/1982 | Heyer et al. | 188/314 X |
| 4,655,440 | 4/1987 | Eckert | 188/299 X |
| 4,749,070 | 6/1988 | Moser et al. | 188/315 X |

FOREIGN PATENT DOCUMENTS

| | | |
|---|---|---|
| 3427843 | 2/1985 | Fed. Rep. of Germany . |
| 3334704 | 4/1985 | Fed. Rep. of Germany . |
| 3712477 | 10/1987 | Fed. Rep. of Germany . |
| 137640 | 8/1984 | Japan ................................. 188/314 |
| 179315 | 9/1985 | Japan ............................. 188/322.14 |

Primary Examiner—George E. A. Halvosa
Attorney, Agent, or Firm—Berman, Aisenberg & Platt

[57] ABSTRACT

A hydraulic shock-absorber and vibration damper comprising a cylinder (1), a damping piston (2) disposed so as to be axially movable inside the cylinder (1) and dividing off two working chambers (9, 10) filled with a hydraulic damping medium and connected by at least one throttle means (62), a piston rod (3) connected to the damping piston (2) and guided in sealing-tight manner out of the cylinder (1), and a compensating chamber (11) connected to one (9) of the working chambers (9, 10) for receiving a volume of damping medium displaced by the piston rod (3). A damping valve (26) driven by an electromagnet (24) and acted upon by a closing force is disposed at the transition between the working chamber (9) and the compensating chamber (11). The damping valve (26) is disposed in series with the throttle means (62), so that all the damping medium flowing between the working chamber (9) and the compensating chamber (11) flows through the damping valve (26). The electromagnet (24) is connected to a valve body (30) of the damping valve (26) so that its closing force can be varied directly via the electromagnet (24).

15 Claims, 3 Drawing Sheets

HYDRAULIC SHOCK-ABSORBER AND VIBRATION DAMPER WITH ADJUSTABLE DAMPING

The invention relates to a hydraulic shock-absorber and vibration damper comprising a cylinder, a damping piston axially movable inside the cylinder and dividing off two working chambers filled with a hydraulic damping fluid and connected by at least one throttle means, a piston rod connected to the damping piston and extending in sealing-tight manner outwards from the cylinder, and a compensating chamber connected to the working chambers for receiving a volume of damping medium displaced by the piston rod, a damping valve controllable via an electromagnet and acted upon by a closing force being disposed at the transition between the working chamber and the compensating chamber.

A shock-absorber of this kind, as used more particularly for motor vehicles, is known from DE-OS No. 37 12 477. In the known shock-absorber, a bypass at the transition between the working chamber and the compensating chamber contains the electro-magnetically driven damping valve and, parallel thereto, additional valves disposed in the cylinder base and having cross-sections through which the volume of damping region displaced by the piston rod is displaced into the compensating chamber. The controllable damping valve thus influences only part of the flow between the working chamber and the compensating chamber, so that the adjusting or control range is small. The damping valve is constructed as a seat valve, and a valve body spring-loaded for generating a closing force comes to abut an annular surface on a valve seat. The valve body constitutes the armature of an electromagnet, so that it is lifted by the action of the electromagnet off the valve seat and against the closing force, thus forming an annular flow cross-section for opening the valve. Since however the damping valve has practically no further damping effect after opening, an additional damping valve, constructed as a spring plate valve, is disposed in series behind the first valve and has a constant invariable damping action. Both valves, i.e. the electromagnetically driven damping valve and the spring plate valve, are secured at the side to an external casing on the shock-absorber, which may be a disadvantage depending on the position in which the shock-absorber is installed. Also the known shock-absorber is very expensive to construct, owing to the number of valves provided. In addition, as already mentioned, the damping adjustment range is too small for many applications.

DE-OS No. 33 34 704 also discloses an adjustable shock-absorber, in which the damping piston has electromagnetically controllable auxiliary valves which influence the actual throttle valves of the piston. One disadvantage is that electromagnets are secured to the piston, thus disadvantageously increasing the moving mass of the piston. Also, electric lines must be guided to the piston-rod for supplying voltage to the electromagnets. The control system also has high inertia, since a pressure head first has to be produced in the auxiliary valve by the movement of the piston and the resulting flow of damping medium.

DE-OS No. 34 27 843 discloses another adjustable shock-absorber, but the shock-absorption thereof is adjusted by mechanically adjusting flow openings operating in a by-pass. Only stepwise adjustment is possible by this method. Owing to the inertia of adjustment of the known shock-absorber, it is impossible for the shock absorption to be automatically adjusted to varying requirements.

The object of the invention is to devise a shock-absorber and vibration damper of the kind according to the preamble having a shock-absorption capacity which can be adjusted over a very wide range and substantially without delay, but which is simple in construction, compact and stable and economic to manufacture.

To this end according to the invention the damping valve is disposed in series with the throttle means, so that all the damping medium flowing between the working chamber and the compensating chamber flows through the damping valve, and the electromagnet is connected to a valve body of the damping valve so that its closing force can be varied directly via the electromagnet.

Since the damping valve in the shock-absorber according to the invention can influence all the medium flowing between the working chamber and the compensating chamber, the shock absorber according to the invention has a very wide adjustment range, and the shock-absorbing power can advantageously be varied steplessly between a minimum and a maximum. Advantageously also there is no need for additional bypass passages in parallel or valves in series, and consequently the shock absorber according to the invention can be constructed in very simple manner with only one damping valve and is therefore also inexpensive to manufacture. In contrast thereto, in the shock absorbers known from the prior art, only a part of the medium flowing between the working chamber and the compensating chamber is conveyed through the damping valve, whereas another part can flow in substantially uncontrolled manner past the damping valve, via additional valves disposed in a parallel bypass. In further contrast to the known shock absorber according to the preamble, in which the damping valve is electromagnetically opened and closed by spring force and by the pressure of the damping medium, the damping valve according to the invention is actuated only by the flow of damping medium, and the electromagnet influences only the closing force of the damping valve counteracting the flow, thus advantageously ensuring that the damping is adjustable and depends directly on the dynamic movements of the shock absorber.

The e.g. hydropneumatic shock absorber and vibration damper, according to the invention has a damping power which can be adjusted almost without delay and steplessly during operation, via measurements by an electronic control system, e.g. in a vehicle, giving information about the actual travelling speed, the speed of compression, travel round bends, loading conditions, etc. The measurements are converted by the electronic control system into a given voltage and/or current and supplied to the electromagnet, which accordingly varies the closing force of the damping valve and consequently varies the pressure of the damping medium needed for opening in one or both sections of operation of the shock-absorber. The shock absorber and vibration damper according to the invention can therefore be adjusted in optimum manner to the actual loading and travelling conditions. Alternatively or in addition to an aforementioned automatic damper control system, the damping force of the shock absorber according to the invention can be manually adjusted, e.g. via a potentiometer for adjusting the voltage supplied to the electromagnet or the corresponding current. Depending on the adjustment, the closing force of the damping valve and consequently the damping force are directly determined. Through the action of the electromagnet according to the invention, therefore, practically any given damping-force characteristic within a family of characteristics can be automatically and/or manually selected and set.

Other advantageous features of the invention are contained in the sub-claims.

The invention will now be explained in detail by way of example with reference to the accompanying drawings, in which.

In the figures, like parts are denoted by like reference numbers.

Figure 1:
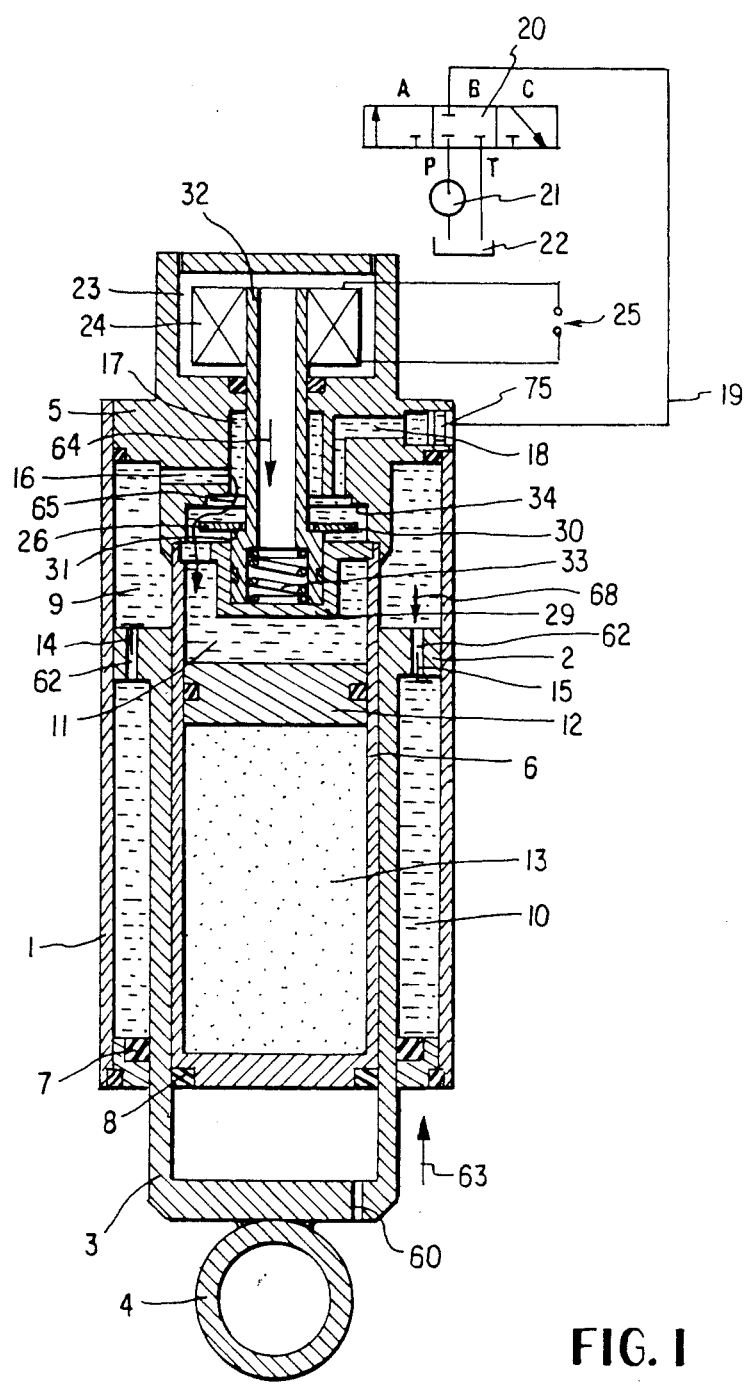
FIG. 1 shows a first embodiment of a shock absorber and vibration damper according to the invention in diagrammatic longitudinal section during compression.

The drawings, by way of example, show a hydropneumatic shock absorber and vibration damper-herinafter called shock-absorber for short-which substantially comprises a cylinder 1, an axially movable damping piston (2) disposed inside cylinder 1, and a piston rod 3 connected to piston 2 and guided in sealing-tight manner out of cylinder 1. At its free end, the piston rod 3 has a connecting member 4 for connecting to a body (not shown) to be damped, e.g. a vehicle wheel. Cylinder 1 has a head part 5 for securing e.g. to a vehicle frame (also not shown).

Piston rod 3 is preferably a hollow cylinder and its end projecting from cylinder 1 is closed except for a vent opening 60. Inside cylinder 1, an inner tube 6 is disposed coaxially and secured to the head part 5 and has a closed end extending to the end of cylinder 1 opposite the head part 5 and into the hollow cylindrical piston rod 3. For this purpose, the damping piston 2 is made annular so that it surrounds the inner tube 6 in an annular space formed between tube 6 and cylinder 1. By this means, the inner wall of piston rod 3 is advantageously guided along the outer jacket of tube 6 along the entire stroke of piston 2. In order to seal the piston rod 3, an outer sealing ring 7 is disposed between piston rod 3 and cylinder 1 and an inner sealing ring 8 between tube 6 and the inner periphery of piston rod 3.

The annular damping piston 2 divides the annular space in the cylinder into a top working chamber 9 facing the head part 5 and a bottom working chamber 10 remote from part 5. Chambers 9 and 10 are both filled with a hydraulic damping medium. The top chamber 9 is connected to a compensating chamber 11 formed inside the inner tube 6 and adapted to receive a volume of damping medium displaced by piston rod 3. In the embodiments in FIGS. 1 and 2, the connection is made by least one transverse duct 16 in the head part 5 and opening into a central chamber 17 in part 5. An adjustable damping valve 26 is disposed between chamber 17 and chamber 11, as will be explained hereinafter. In the embodiment in FIG. 3, in order to connect the top chamber 9 to chamber 11, the jacket of tube 6 has at least one transverse bore 49 which, in this case also, is connected by a damping valve 61 to chamber 11 as described hereinafter.

A floating valve 12 for bounding the compensating chamber 11 is freely movable inside tube 6 and separates chamber 11 from a pneumatic spring chamber 13 likewise formed inside tube 6 and containing an elastically compressible medium such as air. As an alternative to the embodiment in FIGS. 1 and 2, the inner tube 6 can have an open base and the hollow cylindrical piston rod can have a closed base. This advantageously increases the volume of the pneumatic spring chamber, thus providing another means of influencing the pneumatic spring force and/or spring characteristics of the shock absorber according to the invention.

In the embodiments of the invention shown, the damping piston 2 has two throttle means 62, preferably with throttle valves 14 and 15 respectively, for connecting the two working chambers 9 and 10 to one another so as to ensure a flow of damping medium between chambers 9 and 10 when the piston 2 moves, thus already damping or throttling. The throttle means 62 or valves of 14, 15 can also be specially constructed so as to ensure different tensile and pressure stages.

At the transition between the top chamber 9 and the compensating chamber 11, the adjustable damping valve 26 or 61 is disposed as previously mentioned, and two alternative embodiments of it will now be described in detail by way of example.

Figure 2:
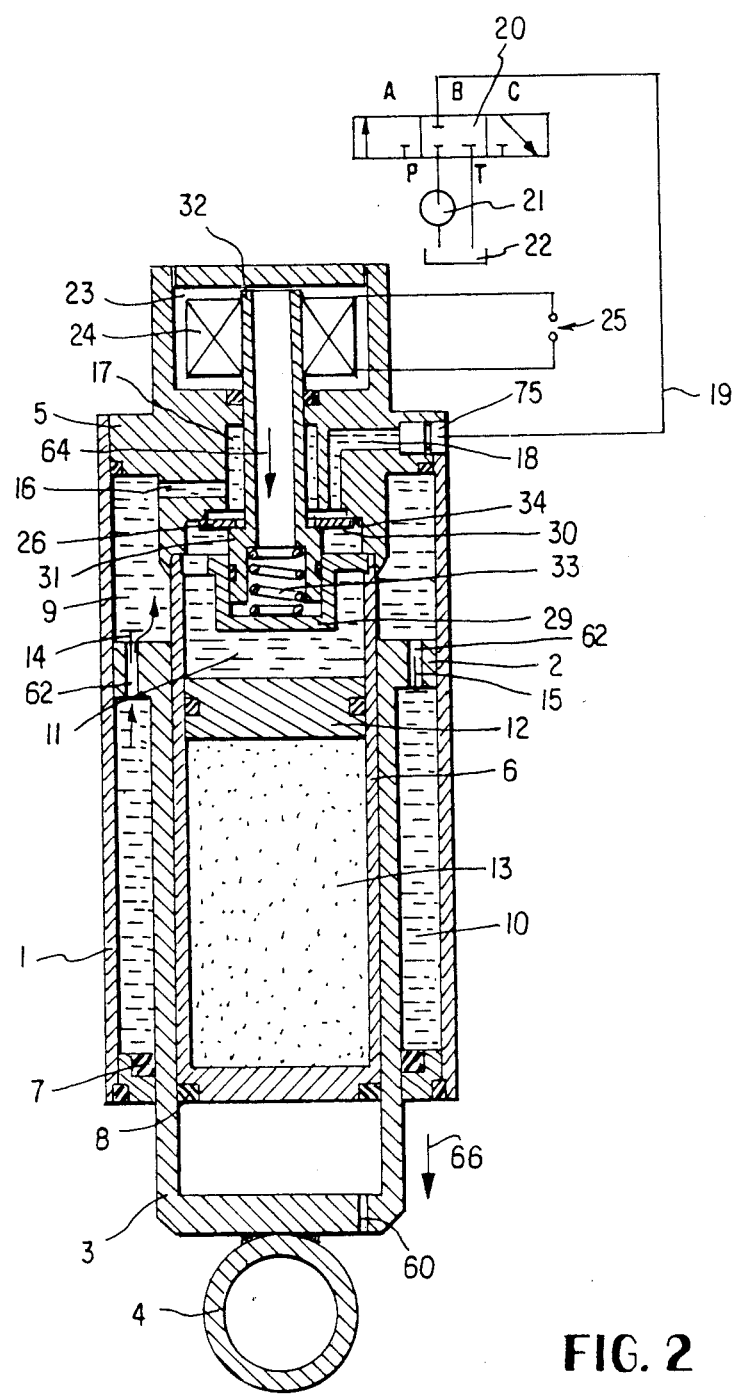
FIG. 2 is view similar to FIG. 1 but during expansion.

In FIGS. 1 and 2, the central chamber 17 of the head part 5 widens in the direction towards chamber 11 via an annular stage 34 which forms an annular valve seat for a disk-shaped valve body 30 of the damping valve 26. A valve stem 32 extends through the central chamber 17 and through valve body 30 and widens via an annular stage 31 on the side of valve body 30 facing chamber 11. Valve body 30 is freely movable on stem 32, and its inner circular periphery surrounds the "thinner" portion of valve stem 32 and is separated therefrom by a narrow annular gap. Inside the free end of valve stem 32, which widens via the annular stage 31, a prestressed valve spring 33 is disposed in an end recess and bears at one end on an annular or base surface of the recess of stem 32 and at the other end on a base of an insertion sleeve 29 secured in a stationary position in the transition region between the head part 5 and the inner tube 6. Sleeve 29 is also used for guiding the wide end of valve stem 32. The valve spring 33 is used for bringing the disk-shaped valve body 30 into a neutral position in which the damping piston 2 is disposed statically, i.e. immovably in cylinder 1 and body 30 is "clamped" in sealing-tight manner between the annular stage 31 of valve stem 32 and the annular stage 34 of chamber 17, thus closing the damping valve 61. The end of valve stem 32 remote from valve body 30 is connected to the armature (not shown in FIGS. 1 and 2) of an electromagnet 24 disposed in a chamber 23 of head part 5, or alternatively the valve stem 32 directly constitutes the armature of electromagnet 24.

The shock absorber in FIGS. 1 and 2 operate as follows. During operation, the damping piston 2 in cylinder 1 is moved in reciprocation in the axial direction. During the stroke of the damping piston 2, damping medium flows through throttle means 62 or valves 14, 15 alternately between the working chambers 9 and 10. In addition, a volume of damping medium corresponding to the volume of the piston rod 3 immersed in cylinder 1 is forced to flow between chamber 9 and compensation chamber 11. This flow is damped or throttled in steplessly adjustable manner via the damping valve 26 according to the invention.

FIG. 1 shows the conditions during "compression", i.e. the damping piston 2 is moved via piston rod 3 in the direction of arrow 63 into cylinder 1. As a result, the throttle valve 15 of piston 2 opens and damping medium flows in the direction of arrow 68 from the top working chamber 9 into the bottom working chamber 10. Also, piston rod 3 displaces a volume of damping medium which, via the transverse duct 16 and central chamber 17, actuates the valve body 30 until the opening force produced by the pressure of the flow is greater than the corresponding closing force of valve 26, whereupon the valve stem 32 is moved by valve body 30 against the closing force, i.e. in the direction of arrow 64, axially in the direction of the compesating chamber 11. This results in an annular gap between valve body 30 and the annular stage 34 forming the valve seat, so that the damping medium can flow through the gap in throttled manner, in the direction of arrow 65 into the compensating chamber 11. As a result the floating piston 12 is axially displaced inside tube 6, so that the medium in the pneumatic spring chamber 13 is compressed and a spring effect is obtained. At the end of the compression stroke of piston 2, valve 26 is closed by the closing force via body 30.

FIG. 2 shows the conditions when piston 2 is moved by tension on piston rod 3 in the direction of arrow 66 back in the direction of the end of cylinder 1 remote from head part 5. In this case, damping medium flows through throttle valve 14 in the direction of arrow 69 from chamber 10 back into chamber 9, and damping medium also flows back from the compensating chamber 11 through valve 26 into chamber 9. The return flow is due to the fact that the pressure in chamber 11 exceeds the pressure in the top working chamber 9 and in the central chamber 17, so that the valve stem 32 moves axially as a result of the pressure and an annular gap in the direction of arrow 64 is formed between the annular stage 31 of valve stem 32 and the valve body 30 adjacent the annular stage 34, and the damping medium flows in throttled manner through the annular gap, in the direction of arrow 67 from chamber 11 through chamber 17 and duct 16 back to the top chamber 9.

The closing force of damping valve 26 is generated on the one hand by the prestressed valve spring 33. On the other hand, according to the invention, the closing force is also adjustable by a force generated by electromagnet 24 and transmitted by valve stem 32 to the disk-shaped valve body 30, in that electromagnet 24 is supplied with a given voltage and/or a given current through electic connections 25, depending on measured data generated by an electronic drive. The electromagnet, via the closing force of valve disk 30, thus immediately controls the setting of the damping valve 26 according to the invention. In this manner the actual damping force is automatically and without delay adapted to the particular situation, e.g. when travelling over uneven ground.

Figure 3:
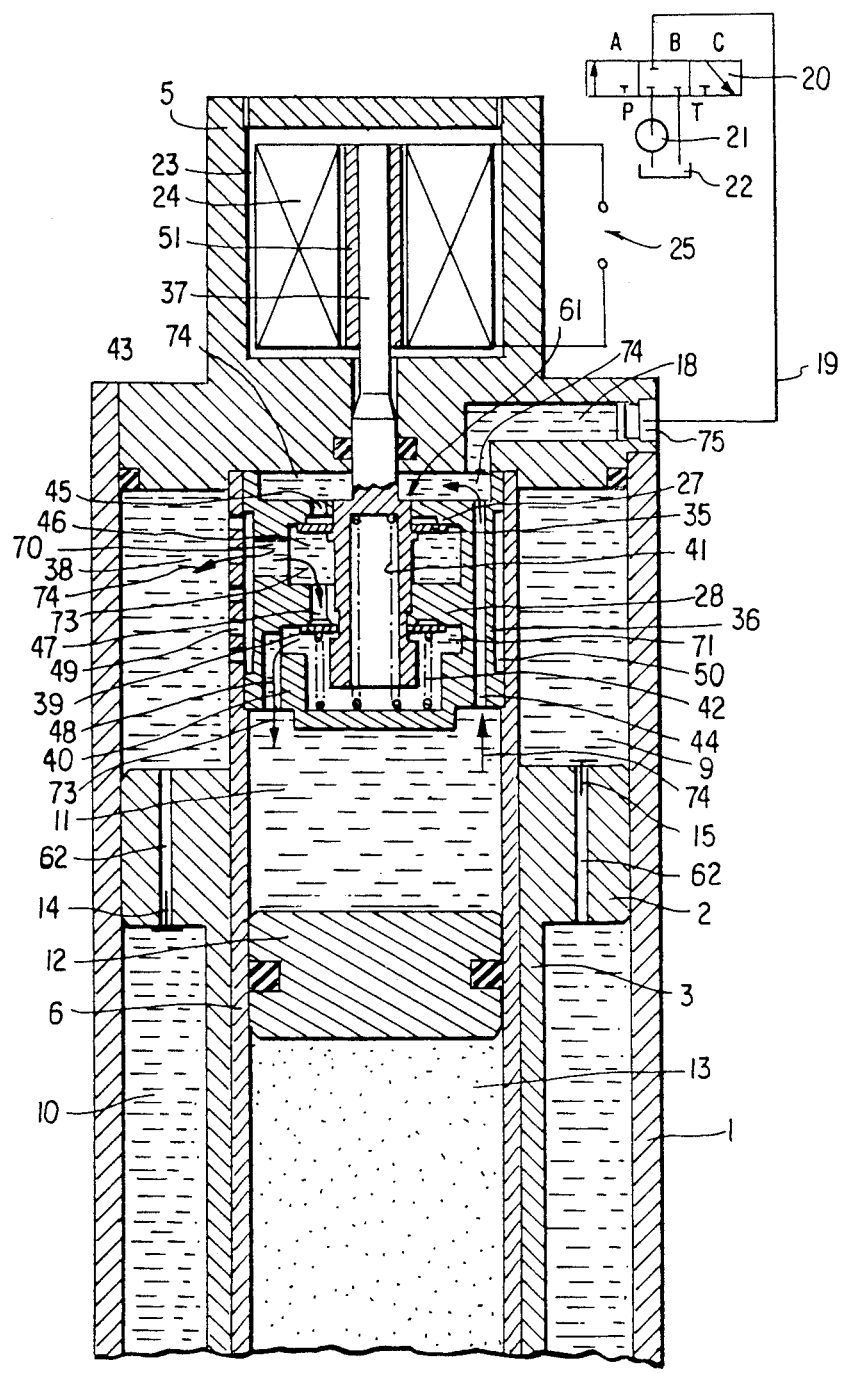
FIG. 3 is a partial longitudinal section, on a larger scale than in FIGS. 1 and 2, of a second embodiment of the shock absorber according to the invention, in a neutral position.

In the embodiment of the shock absorber according to the invention in FIG. 3, the damping valve 61 is advantageously a double valve comprising two components 27 and 28, each comprising an annular valve body 35, 36, component 28 cooperating with valve body 36 to damp the flow into chamber 11 and component 27 cooperating with body 35 to damp the flow from chamber 11. A substantially cylindrical insertion part 40, which for manufacturing and assembly reasons is preferably in a number of parts, is disposed in a stationary position inside the end region of tube 6 adjacent the head part 5.

The insertion part 40 has an annular groove in its peripheral surface adjacent the inner wall of tube 6, and an annular duct 50 is formed between part 40 and tube 6. A region of the inner tube 6 disposed in the axial direction near the annular duct 50, has at least one transverse bore 49 in its wall, connecting the top working chamber 9 to the annular duct 50. Duct 50 is connected by least one transverse duct 70 to a central chamber 46 formed inside the insertion part 40. A surface of the central chamber 46 facing the head part 5 constitutes the valve seat for the annular valve body 35 of the first component valve 27. At least one axial duct 45 opens into the valve seat and, on its other side facing the head part 5, opens into a chamber 43 formed by an end recess in the insertion part 40. Also, starting the central chamber 46 of insertion part 40, at least one axial duct 47 extends to near a surface of a receiving chamber 71 facing the head part 5 and constituting a seat for the valve body 36 of the second component valve 28, chamber 71 being connected by at least one duct 48 to the compensating chamber 11. Chamber 11 is also directly connected by an axial duct 44 to the end chamber 43. A valve stem 37 extends centrally through the insertion part 40 and through the two annular valve bodies 35 and 36 and has annular stages 38, 39 respectively abutting the sides of valve members 35, 36 remote from the head part 5. A prestressed spring 41 is disposed in an end recess in valve stem 37 remote from head part 5 and bears at one end on the base of the recess in valve stem 38 and at the other end on a base 72 of the insertion rod 40. Preferably in this embodiment of the invention, a second valve spring 42 is provided and disposed with prestress inside the receiving chamber 71, and surrounds the end of valve stem 37 concentrically and with a small clearance and bears at one end on base 72 of part 40 and at the other end directly on the second valve body 36. By means of the additional spring 42, the components 27, 28 of the damping valve 61 according to the invention and formed by the two valve bodies 35, 36 can be acted upon by different closing forces or prestressing forces. The valve stem 37 is connected to armature 51 of electromagnet 24 disposed in chamber 23 of head part 5.

The embodiment of the shock absorber according to the invention shown in FIG. 3 operates as follows. If piston 2 is moved via rod 3 into cylinder 1, the damping medium flows out of the top working chamber 9 into the bottom chamber 10 in the manner described previously. In addition, the damping medium flows from chamber 9, depending on the volume displaced by piston rod 3, in the direction of arrows 73 in FIG. 3 through the transverse bore or bores 49 in the inner tube 6 and through annular duct 50, transverse duct 70, chamber 46 and the axial duct 47, where it acts on the disk-shaped valve member 36, until the opening force produced by the flow pressure becomes greater than the closing force of the component valve 28. At this moment, valve 28 is opened by axial displacement of valve stem 38 via valve body 36, so that the damping medium can flow in throttled manner through the resulting annular gap, through duct 48 into the compensating chamber 11. The return flow of damping medium occurs in the direction of arrow 74 shown in FIG. 3, i.e. through axial duct 44, the end chamber 43 and the axial duct 45. Here the damping medium acts on the body 35 of valve 27. Valve 27 opens when the opening force produced by the flow becomes greater than the closing force of valve 27. As before, valve stem 37 is axially displaced via valve body 35, thus forming an annular gap between insertion part 40 and valve body 35, so that the damping medium flows in throttled manner into chamber 46 and thence through duct 70, duct 50 and bore 49 back to the top working chamber 9.

In this embodiment also, the closing force of valve 61 or the two component valves 27 and 28 is on each occasion influenced by the electromagnet in the manner described previously.

In a particularly advatageous embodiment of the invention as shown in FIG. 3, the inner tube 6 near the annular duct 50 has a number of axially spaced transverse bores 49. As a result of this advantageous feature, the damping piston 2 moving into cylinder 1 is slowed down in the end part of cylinder 1, since the piston successively "passes" and closes the transverse bores 49, thus reducing the total flow cross-section in the direction of chamber 11 and consequently increasing the flow resistance and gradually slowing down piston 2.

In an additional embodiment of the invention (FIGS. 1 to 3) cylinder 1 has a connecting duct 18 for adjusting the level of the shock absorber according to the invention. Duct 18 opens at one end into the central chamber 17 (FIGS. 1, 2) or the end chamber 43 (FIG. 3) and its other end can be connected by a member 75 to a tube or flexible line 19 (shown diagrammatically only in the drawings). Line 19 can be connected to multi-way valve 20 for adjusting the level by supplying damping medium from a pump 21 or discharging it into a tank 22.

The invention is not restricted to the embodiments shown and described, but includes all equivalent embodiments according to the invention.

I claim:

1. A hydraulic shock-absorber and vibration damper comprising a cylinder, an annular damping piston axially movable inside the cylinder and dividing internal space therein into first and second working chambers filled with a hydraulic damping fluid and connected to each other by at least one throttle means, a hollow cylindrical piston rod connected to the damping piston and extending in sealing-tight manner outwards from the cylinder an inner tube extending with slight peripheral clearance through the annular damping piston and into the hollow cylindrical piston rod so as to be inside the cylinder and coaxial therewith, a compensating chamber to the working chambers for receiving a volume of damping medium displaced by the piston rod, a damping valve adapted to be acted upon by a closing force to control a communicating passage between the first working chamber and the compensating chamber, the damping valve being disposed in series with the throttle means whereby all the damping medium flowing between the first working chamber and the compensating chamber flows through the damping valve, an electromagnetic connected to a valve body of the damping valve and arranged to act on the valve body whereby the closing force of the damping valve can be varied directly via the electromagnet and be steplessly increased and reduced by the electromagnet, starting from a prestressing force generated by at least one prestressed valve-closing spring the valve body of the damping valve being disk-shaped and being adapted to cooperate with an annular valve seat surface and being arranged to rest with slight clearance on a valve stem connected to the electromagnet, the valve-closing spring being arranged to bear at one end thereof on the valve stem and at the other end thereof on a base of a stationary insertion sleeve, the stationary insertion sleeve being secured in a stationary position in a transition region between a heat part of the cylinder and the inner tube and being adapted to guide a wide end of the valve stem.

2. A shock-absorber and vibration damper according to claim 1, wherein the damping valve is a double valve comprising first and second component valves each having a valve body, the first component valve co-operating with the valve body to influence and throttle the flow of damping fluid into the compensating chamber, and the second component valve co-operating with the valve fluid body to damp and influence the flow of damping fluid out of the compensating chamber.

3. A shock-absorber and vibration damper according to claim 2, wherein the respective valve bodies of the first and second component valves are each disk-shaped and each co-operate with a seat surface, and are disposed on a common valve stem connected to the electromagnet.

4. A shock-absorber and vibration damper according to claim 2, wherein the valve bodies of the first and second component valves are prestressed by a common spring via the valve stem.

5. A shock-absorber and vibration damper according to claim 4, wherein the valve body of the second component valve is additionally prestressed by a second spring, the common spring and the second spring being arranged to bear on a stationary-mounted insertion part.

6. A shock-absorber and vibration damper according to claim 2, wherein side surfaces of the valve bodies remote from the respective seat surfaces each bear on a respective annular stage of the valve stem.

7. A shock-absorber and vibration damper according to claim 1, wherein the piston-rod is guided in a sealing-tight manner out of the cylinder by an outer sealing ring disposed in a sealing-tight manner between the cylinder and the outer periphery of the piston rod and by an inner sealing ring similarly disposed between the inner periphery of the piston rod and the outer periphery of the inner tube.

8. A shock-absorber and vibration damper according to claim 1, wherein the inner tube is secured to a head part of the cylinder opposite the outwardly-guided end of the piston rod, and a part of the space in the inner tube facing the head part constitutes the compensating chamber connected to the working chamber via the damping valve.

9. A shock-absorber and vibration damper according to claim 8, wherein the damping valve is disposed in a connecting region between the inner tube and the head part, and wherein at least one transverse duct of the head part and/or at least one transverse bore in the inner tube leads via the damping valve to the compensating chamber.

10. A shock-absorber and vibration damper according to claim 8, wherein the electromagnet is disposed inside a chamber formed in the head part, and the valve stem is connected to an armature of the electromagnet or itself constitutes an armature.

11. A shock-absorber and vibration damper according to claim 8, wherein a portion of the inner tube adjacent to its securement to the head part and inside an end region of the piston stroke in the working chamber has a number of transverse bores spaced apart in the axial direction and leading to the damping valve.

12. A shock-absorber and vibration damper according to claim 1, wherein the compensating chamber is bounded by a floating piston disposed so as to be freely movable inside the inner tube, and wherein a portion of the space in the inner tube separated from the compensating chamber by the floating piston constitutes a pneumatic spring chamber.

13. A shock-absorber and vibration damper according to claim 12, including a projecting end region of the inner tube facing the outwardly-guided end of the piston rod and closed in a fluid-tight manner, and wherein the piston rod has a vent opening in the part thereof extending axially outwards via the inner tube.

14. A shock-absorber and vibration damper according to claim 12, wherein the inner tube, near a bottom wall facing the outwardly-guided end of the piston rod, is formed with at least one through-opening, and the outwardly-guided end of the piston rod is closed in a fluid-tight manner.

15. A shock-absorber and vibration damper according to claim 1, wherein the cylinder has a connecting duct comprising an external connecting member for connecting a damping-fluid line connectable via a multi-way valve to a supply pump or to a discharge tank.

* * * * *